(No Model.)
J. T. RICKETTS.
HAND CORN PLANTER.
No. 299,679.  Patented June 3, 1884.
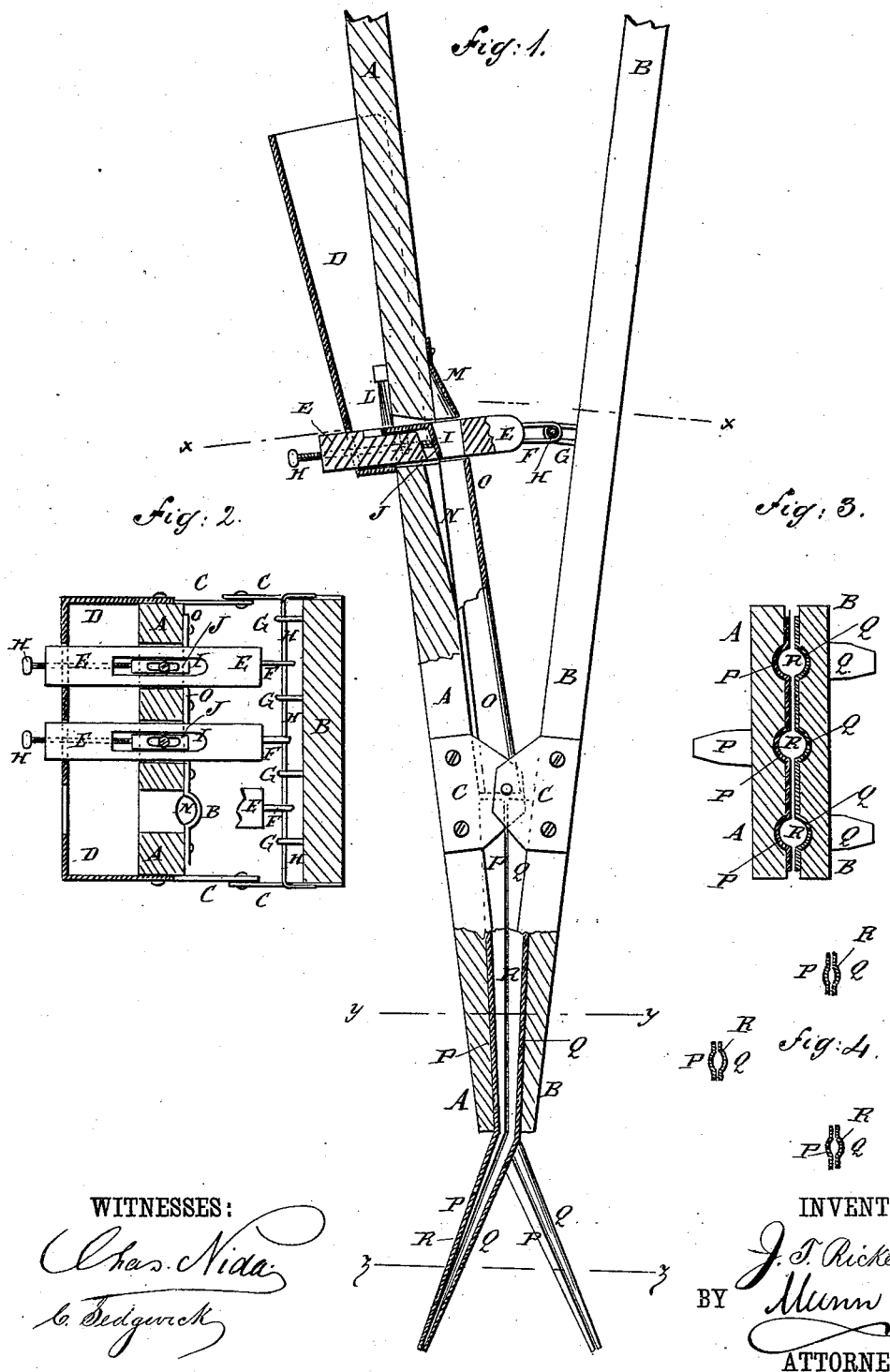
WITNESSES:
Chas. Nida
C. Sedgwick
INVENTOR:
J. T. Ricketts
BY Munn & Co
ATTORNEYS.
N. PETERS, Photo-Lithographer, Washington, D. C.

UNITED STATES PATENT OFFICE.

JOHN THOMAS RICKETTS, OF CAMARGO, KENTUCKY.

HAND CORN-PLANTER.

SPECIFICATION forming part of Letters Patent No. 299,679, dated June 3, 1884.

Application filed February 1, 1884. (No model.)

*To all whom it may concern:*

Be it known that I, JOHN THOMAS RICKETTS, of Camargo, in the county of Montgomery and State of Kentucky, have invented certain new and useful Improvements in Hand Corn-Planters, of which the following is a full, clear, and exact description.

Reference is to be had to the accompanying drawings, forming part of this specification, in which similar letters of reference indicate corresponding parts in all the figures.

Figure 1 is a side elevation of my improvement, partly in section, and parts being broken away. Fig. 2 is a sectional plan view of the same taken through the line $x$ $x$, Fig. 1, part being broken away. Fig. 3 is a sectional plan view of the same taken through the line $y$ $y$, Fig. 1. Fig. 4 is a sectional plan view of the same taken through the line $z$ $z$, Fig. 1.

The object of this invention is to deposit the kernels of corn in the ground separate and in triangular form, so as to make the hills compact and leave as much space as possible between the hills.

The invention consists in the construction and arrangement of parts, as will be hereinafter fully described and claimed.

A B are the bars or plates of the planter, to the side edges of which, at a little distance from their lower ends, are attached plates C, the adjacent edges of each pair of which are overlapped, and are hinged to each other by bolts or rivets, as shown in Figs. 1 and 2.

To the outer side of the bar A is secured the seed-hopper D, from which the seed is removed by the three slides E. The slides E pass through openings in the bar A and in the outer side of the hopper D, as shown in Figs. 1 and 2. The inner ends of the slides E are connected with the bar B by staples F G and a rod, H, or by other suitable means, so that the said slides will be operated by the opening and closing of the bars A B. In each slide F is formed an opening, I, to receive seed and carry it out of the hopper D. The size of the opening I is regulated by blocks or plates J, inserted in the openings I, and adjusted by hand-screws K, passing in through the outer ends of the said slides. The plates J are made with flanges which overlap the upper sides of the slides E, and are slotted to receive screws for holding the said gage-blocks down to their seats, and which should be made sufficiently loose to allow the gage-blocks to be moved by the hand-screws K. The slides E are kept from carrying out any more seed than the openings I will hold by brushes L, attached to the bar A above the openings through which the slides E work. As the openings I pass out at the inner side of the bar A, they are covered by hoods M, attached to the said bar A, so that the seed can escape only by passing down through the passages N, formed by covering grooves in the inner side of the bar A by semi-tubular plates O. The plates O can be made in one piece, or each passage can have its own plate. The plates O extend down to the hinges C, where they meet semi-tubular plates P Q, fitted into grooves in the bars A B, the said plates P Q having their concave sides toward each other, as shown in Figs. 1 and 3, so as to form passages R, to serve as continuations of the passage N.

At the lower ends of the bars A B two pairs of the plates P Q are bent forward, and the third pair is bent to the rearward, as indicated in Fig. 1, so that the lower ends of the three pairs will be equidistant from each other and at the angles of an equilateral triangle, as indicated in Fig. 4. The parts of the plates P Q projecting beneath the ends of the bars A B can be connected by webs or not, as may be desired; but I prefer to make them without the connecting-webs, as shown in Figs. 1 and 4. The corresponding projecting parts of the plates P Q are tapered, so that their lower ends will meet nearly at a point, and will thus enter the soil easily.

In using the planter the upper ends of the bars A B are drawn apart, which closes the plates P Q and draws back the slides E, allowing the seed in the openings I to drop into the passages N and slide down into the passages R. The tubes P Q are then thrust into the soil in the place where the hill is to be planted, and the upper ends of the bars A B are drawn toward each other, which separates the plates P Q and allows the seed to drop into the soil. The planter is then drawn from the ground and carried forward to the place for the next hill, where the operation is repeated, and so on until the desired amount of planting has been done.

Having thus described my invention, what I claim as new, and desire to secure by Letters Patent, is—

1. In a hand corn-planter, the combination of the hinged bars A B, provided, respectively, with semi-tubular plates P Q at or below the point of hinging, two pairs of said plates being bent forward and one pair rearward, as shown, with the semi-tubular plates O, and an arm, A, leading from the seed-hopper to the plates P Q, said hopper being provided with separate dropping-slides each communicating with one pair of the transversely-arranged plates P Q through the plates O, as set forth.

2. In a seed-dropper having hinged arms, the plate P, formed in one piece with three semi-tubular grooves, two of the said tubular portions being bent in a forward direction and one in a rearward direction, in combination with a similarly-constructed plate, Q, whereby when the semi-tubular portions of the plates P Q come together separate passages R are formed, substantially as set forth.

JOHN THOMAS RICKETTS.

Witnesses:
G. N. BOTTS,
J. M. RICKETTS.